(12) United States Patent
Gielniewski et al.

(10) Patent No.: US 11,827,461 B2
(45) Date of Patent: Nov. 28, 2023

(54) TRANSPORT DEVICE FOR TRANSFERRING ROD-LIKE ARTICLES

(71) Applicant: International Tobacco Machinery Poland Sp. z o.o., Radom (PL)

(72) Inventors: Adam Gielniewski, Kowala (PL); Ryszard Siara, Radom (PL)

(73) Assignee: International Tobacco Machinery Poland Sp. z oo, Radom (PL)

( * ) Notice: Subject to any disclaimer, the term of this patent is extended or adjusted under 35 U.S.C. 154(b) by 26 days.

(21) Appl. No.: 17/627,618

(22) PCT Filed: Jun. 11, 2020

(86) PCT No.: PCT/EP2020/066152
§ 371 (c)(1),
(2) Date: Jan. 14, 2022

(87) PCT Pub. No.: WO2021/008785
PCT Pub. Date: Jan. 21, 2021

(65) Prior Publication Data
US 2022/0274785 A1 Sep. 1, 2022

(30) Foreign Application Priority Data
Jul. 16, 2019 (PL) ........................ P.430612

(51) Int. Cl.
*A24C 5/35* (2006.01)
*B65G 47/44* (2006.01)
*B65G 47/51* (2006.01)

(52) U.S. Cl.
CPC ............ *B65G 47/5127* (2013.01); *A24C 5/35* (2013.01); *B65G 47/44* (2013.01)

(58) Field of Classification Search
CPC ............ B65G 47/5122; B65G 47/5127; B65G 47/5131
See application file for complete search history.

(56) References Cited

U.S. PATENT DOCUMENTS 8,443,964 B2 * 5/2013 Fallon ................ B65G 47/5122
198/606
8,469,181 B2 * 6/2013 Figarski .................. A24C 5/35
198/347.1

FOREIGN PATENT DOCUMENTS

EP 2995206 A1 * 3/2016 ................ A24C 5/35
GB 995663 A * 1/1966 ................ A24C 5/35

* cited by examiner

*Primary Examiner* — William R Harp
(74) *Attorney, Agent, or Firm* — STLG Law Firm (57) ABSTRACT

A transport device for transferring rod-like articles, the device comprising: a first conveyor configured to transfer the rod-like articles as a multilayer stream in a first transferring direction; a second conveyor configured to transfer the rod-like articles as the multilayer stream in a second transferring direction opposite to the first transferring direction; wherein the first conveyor is located at least partially above the second conveyor; a transferring channel for transferring the rod-like articles from the first conveyor to the second conveyor in a third transferring direction, the transferring channel being formed by a first wall located at the end of the first conveyor and a second wall distanced from the first wall by a distance equal to a width of the multilayer stream of the rod-like articles, wherein the second wall is located above the second conveyor; wherein at least the first conveyor and the transferring channel are movable in a first conveyor displacing direction corresponding to the first transferring direction or to the second transferring direction. The first wall forms a cover of the first conveyor; and the first wall is shaped such that there is a variable distance between the first wall and the second wall in a transverse direction that is transverse with respect to the third transferring direction of the rod-like articles in the transferring channel.

15 Claims, 6 Drawing Sheets

TRANSPORT DEVICE FOR TRANSFERRING ROD-LIKE ARTICLES

TECHNICAL FIELD

The present disclosure relates to a device for transferring rod-like articles, in particular for application in tobacco industry.

BACKGROUND

Rod-like articles produced in tobacco industry, such as filters with mouthpieces, multi-segment filter rods, filtering material rods, multichannel rods, rods made of spongy material, thin-walled and thick-walled tubes and other rods are final or semi-finished products for producing other products.

Most of the filled rod-like articles have some elastic resiliency, however cardboard or paper tubular rod-like articles, in particular thin-walled articles, become relatively easily deformed. Due to the requirement of maintaining high quality of the finished products, there is a need for providing transporting assemblies, wherein the risk of deformation of the articles is minimized.

Known transporting assemblies utilize transfer channels for connecting conveyors, wherein the pressure exerted on the lowermost positioned rod-like articles resulting from the height of the stack of the rod-like articles in the channel can cause deformation of the lowermost lying articles. Storage and transport assemblies are known in which the stream height on an upper conveyor is very high due to the large storage capacity required.

A British patent application GB995663 presents a transport device comprising two conveyors located one above the other, wherein the upper conveyor is supplied from a hopper located above this conveyor. A transferring channel between the upper and the lower conveyor is formed by an upper conveyor belt wound on a roller of this conveyor and is formed by the surface being a section of a circular cylinder, wherein the section is located coaxially with the roller of the conveyor.

SUMMARY

The transport device according to the invention allows forming a multilevel storage and transport device, wherein the risk of damaging the rods is reduced.

There is disclosed herein a transport device for transferring rod-like articles, the device comprising: a first conveyor configured to transfer the rod-like articles as a multilayer stream in a first transferring direction; a second conveyor configured to transfer the rod-like articles as the multilayer stream in a second transferring direction opposite to the first transferring direction; wherein the first conveyor is located at least partially above the second conveyor; a transferring channel for transferring the rod-like articles from the first conveyor to the second conveyor in a third transferring direction, the transferring channel being formed by a first wall located at the end of the first conveyor and a second wall distanced from the first wall by a distance equal to a width of the multilayer stream of the rod-like articles, wherein the second wall is located above the second conveyor; wherein at least the first conveyor and the transferring channel are movable in a first conveyor displacing direction corresponding to the first transferring direction or to the second transferring direction. The first wall forms a cover of the first conveyor; and the first wall is shaped such that there is a variable distance between the first wall and the second wall in a transverse direction that is transverse with respect to the third transferring direction of the rod-like articles in the transferring channel.

The first wall of the transferring channel may have a shape of a section of a lateral surface of a cylinder having an elliptical base.

The second wall of the transferring channel may have a shape of a section of a lateral surface of a cylinder having an elliptical base.

The first wall of the transferring channel may have a shape of a section of a lateral surface of a cylinder having an elliptical base, and the second wall of the transferring channel has a shape of a section of a lateral surface of a cylinder with a circular base.

The first wall of the transferring channel may have a shape of a section of a lateral surface of a cylinder having a circular base, and the second wall of the transferring channel has a shape of a section of a lateral surface of a cylinder having a circular base, wherein the first wall and the second wall of the transferring channel are non-coaxial.

The shape of the first wall of the transferring channel may correspond to a multi-segment line.

The device may further comprise a restraining element, which is flexible or articulated, and is mounted to an inlet of an upper part of the transferring channel.

The first conveyor may be slidable linearly.

The first conveyor may be rotatable.

The device may further comprise a sensor for detecting a level of filling of the transferring channel with the rod-like articles.

The device may further comprise a sensor for detecting an excess of the rod-like articles on the first conveyor.

The device may further comprise an inlet channel and an outlet channel.

The device may further comprise a third conveyor and a second transferring channel, wherein the rod-like articles flow from the second conveyor is effected through the second transferring channel to the third conveyor, wherein the flow along the second conveyor and the third conveyor, which are located at least partially one above the other, is effected in opposite directions.

The transferring channel may have the second wall formed as a chain conveyor.

The transferring channel may have the second wall formed as a belt conveyor.

BRIEF DESCRIPTION OF FIGURES

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, or apparatuses described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

Figure 1:
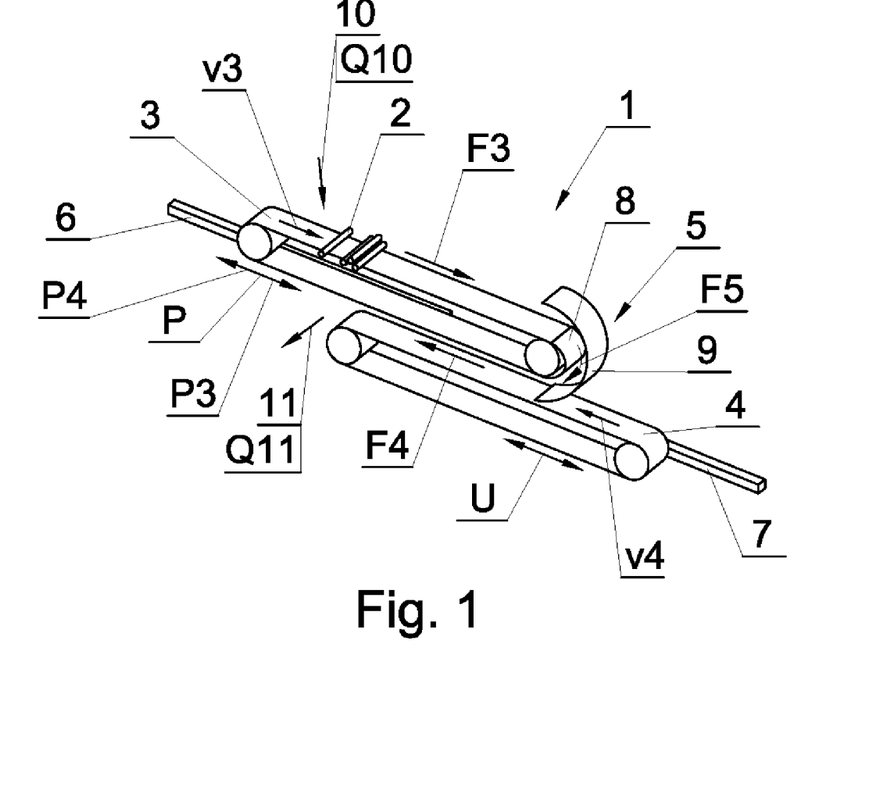
FIG. 1 shows a first embodiment of a transport device in an isometric view.

A transport device 1 for transferring rod-like articles 2, as presented in a first embodiment in FIG. 1, comprises a first conveyor 3, a second conveyor 4 and a transferring channel 5. The transport device 1 is constructed such that the rod-like articles 2 (in a drawing, for increasing clarity, only a few articles are presented) are transferred in a form of a multilayer stream F (in other words, in a form of a multilayer stream of the rod-like articles), namely a stream moving in a first transferring direction F3 along the first conveyor 3, and are transferred in a stream F5 through the transferring channel 5 onto the second conveyor 4 and are transferred further in the multilayer flow in a second transferring direction F4 along the second conveyor 4. The conveyors 3, 4 may have a form of belt or chain conveyors. During the operation of the device, the belts or chains move with velocities v3 and v4, respectively. The drives of these conveyors are not presented in the drawing to preserve clarity. The first conveyor 3 together with the transferring channel 5 is mounted movably on a linear guide 6 and is configured to move the transferring channel 5 in a first conveyor displacing direction P parallel to the transferring directions F3 and F4. In the transferring channel 5 the rod-like articles 2 move downwards in the third transferring direction F5. The second conveyor 4 may be stationary or may be movably mounted on a linear guide 7 and may be moved in a second conveyor displacing direction U. The guides 6 and 7 are typical linear guides. A driving assembly for moving the first conveyor 3 with the transferring channel 5 and the second conveyor 4 is not presented in the drawing for clarity reasons, wherein for driving the first conveyor 3 or the second conveyor 4 a mechanism with a lead screw or a toothed belt transmission may be used. The transferring channel 5 is formed by two walls 8, 9, wherein the first wall 8 is located at an end side of the first conveyor 3 and the second wall 9 is distanced from the first wall 8 by a distance equal to a width of the stream of the rod-like articles 2 and located above the second conveyor 4. The position of the second wall 9 relative to the first wall 8 does not change. The rod-like articles 2 may be supplied from above to the first conveyor 3 essentially in the supply direction indicated by reference 10, for example perpendicularly to the first conveyor 3, or along the first conveyor 3 in the direction corresponding to the first transferring direction F3. The rod-like articles 2 are received from the second conveyor 4 downwards essentially in the receive direction indicated by reference 11, optionally along the second conveyor 4 in the direction corresponding to the second transferring direction F4. An input multilayer stream flow rate is indicated by reference Q10, wherein an output multilayer stream flow rate is indicated by reference Q11. Feeding and receiving the rod-like articles 2 may be performed by means of any known means, such as gravity channels, belt or chain conveyors.

In case when the flow rate of the input multilayer stream Q10 is equal to the flow rate of the output multilayer stream Q11, the conveyors 3 and 4 operate with velocities v3 and v4 which are equal to each other, wherein the first conveyor 3 and the transferring channel 5 do not change their position. The flow rate of the input multilayer stream Q10, in which the rod-like articles 2 are fed onto the first conveyor 3 of the transport device 1 may momentarily differ from the flow rate of the output multilayer stream Q11, in which the rod-like articles 2 are received from the second conveyor 4. The transport device 1 can accumulate a certain amount of the rod-like articles 2, which is redundant if the flow rate of the input multilayer stream Q10 is greater than the flow rate of the output multilayer stream Q11. The capacity of the transport device 1, defined as the amount of the rod-like articles 2 that can be accumulated on the first conveyor 3 and the second conveyor 4, is used to compensate for the difference in the flow rate of the multilayer stream Q10 and Q11, i.e. the transport device 1 has a function of storing the rod-like articles 2. If the flow rate Q10 is greater than the flow rate Q11, the first conveyor 3, together with the transferring channel 5, moves in the first conveyor first displacing direction P3 to the right (assuming that the second conveyor 4 is stationary), until the maximum capacity and the most right position are reached. If the flow rate Q10 is lower than the flow rate Q11, the first conveyor 3 together with the transferring channel 5 move in the first conveyor second displacing direction P4 to the left, until the minimal capacity and the most left position are reached. In case of a temporary difference of the input flow rate Q10 and the output flow rate Q11, the first conveyor 3 together with the transferring channel 5 are moved until the flow rates Q10 and Q11 are equalized.

Figure 2:
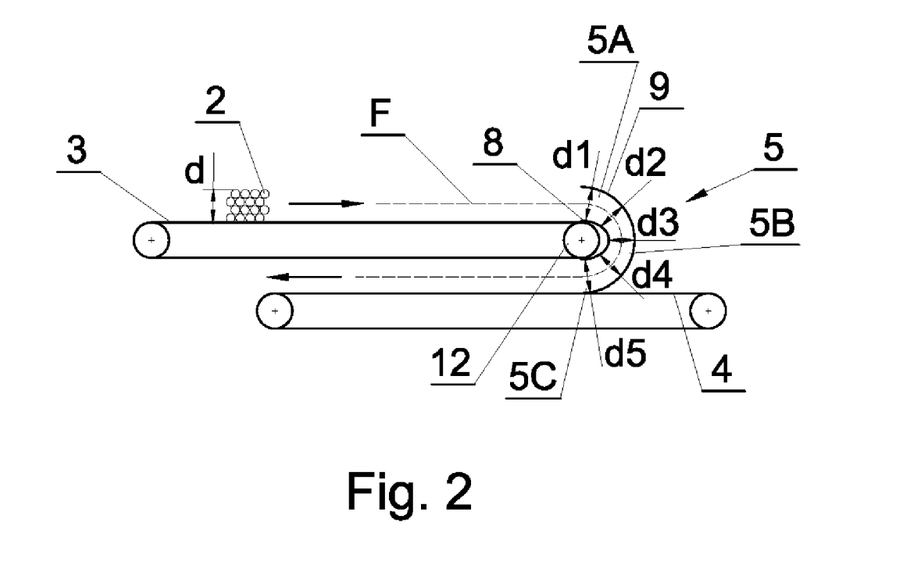
FIGS. 2, 3 and 5 show the first embodiment of the transport device in a front view.
Figure 3:
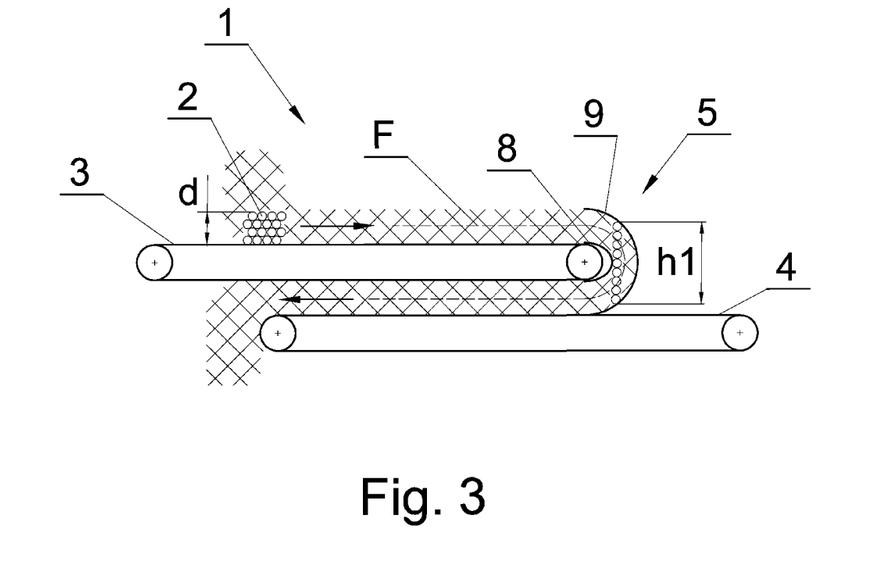
Figure 4:
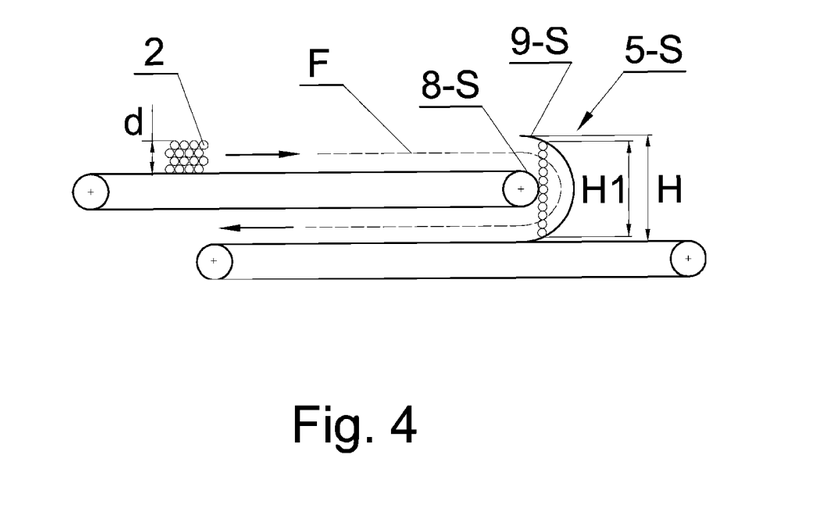
FIG. 4 shows a transport device known from the prior art.

A dashed line in FIG. 2 indicates the multilayer stream F of the rod-like articles 2 across the transport device 1, wherein the dashed line represents substantially the center of the multilayer stream F. On the first conveyor 3 a height d of the multilayer stream F is defined by a feeding device that feeds the rod-like articles 2 on the first conveyor 3. In the transferring channel 5 the multilayer stream F is defined by the shape of the walls 8 and 9. The first wall 8 is located at the end of the first conveyor, i.e. at a roller 12. The first wall 8 constitutes a cover for the roller 12 and for a transfer surface of the belt of the first conveyor 3. In the presented embodiment the first wall 8 is a section of an elliptical cylinder, i.e. it is a section of the cylinder that has an elliptical base. The second wall 9 is a section of a circular cylinder, i.e. it is a section of the cylinder that has a circular base. The walls 8, 9 form the multilayer stream F, and in an upper part 5A of the transferring channel 5 the walls 8, 9 are arranged convergently and cause narrowing of the stream F, in a middle part 5B the multilayer stream has the smallest width, wherein in a lower part 5C of the transferring channel 5 the walls are divergent and allow for widening of the stream F. It is presented by means of dimensions d1 to d5 of the transferring channel 5 in a transverse direction that is transverse with respect to the transferring directions of the multilayer stream F3, F4, F5, in a region where the first wall 8 covers the end of the first conveyor 3. The width d1 of the transferring channel 5 is close to the height d of the multilayer stream on the first conveyor 3, further the transferring channel 5 is narrowed, the width d2 is smaller than the width d1, and the width d3 in the middle of the length of the transferring channel 5, in the middle part 5B, is smaller than the width d2 and is the smallest on the length of the transferring channel 5. The width d4 of the transferring channel 5 in its lower part 5C is greater than the width d3, and the width d5 is greater than the width d4, wherein the width d5 is close to the height of the multilayer stream F on the second conveyor 4. The change of the width of the transferring channel 5 in the transverse direction that is transverse with respect to transferring directions of the multilayer stream F3, F4, F5 can also be obtained by making the first wall 8 and the second wall 9 in the form of sections of the lateral surfaces of the elliptical cylinders. Owing to the decrease of the width of the transferring channel 5, the pressure exerted by the rod-like articles 2 in the transferring channel 5 on the rod-like articles located on the surface of the second conveyor 4 is significantly reduced, owing to which the risk of damaging of these articles is reduced. The transferring channel from FIG. 2 is also presented in FIG. 3, wherein in the multilayer stream F (depicted as hatched area), an exemplary stack of the rod-like articles 2 is presented, the stack having a height h1 exerts pressure on the rod-like articles 2 located at the bottom at the surface of the second conveyor 4. For comparison, FIG. 4 shows a prior art transport assembly, wherein a transferring channel 5-S is formed by two circularly cylindrical coaxial walls 8-S and 9-S, wherein the wall 8-S is formed on a cylindrical roller by a belt of an upper conveyor. Presented stack, of the rod-like articles 2, having a height H greater than h1, exerts higher pressure on the lowermost lying articles, than in case of the device according to the invention. The higher is the height of the multilayer stream F, the higher is the pressure exerted by the stack of the rod-like articles. The highest pressure is exerted by the stack of rod-like articles in the transferring channel 5-S having the height H being a sum of the height of the multilayer stream F on both conveyors and the length of the transferring channel (the distance between the transfer surfaces of both conveyors). The action of the rod-like articles stack on the lowermost lying articles causes the greatest deformations during stoppage of the stream. During temporary stoppage of the multilayer stream F in the transport assembly according to the invention, owing to the change of the channel width and the corresponding decrease of the effective stack height of the rod-like articles 2, the risk of deformation of the articles is decreased.

Figure 5:
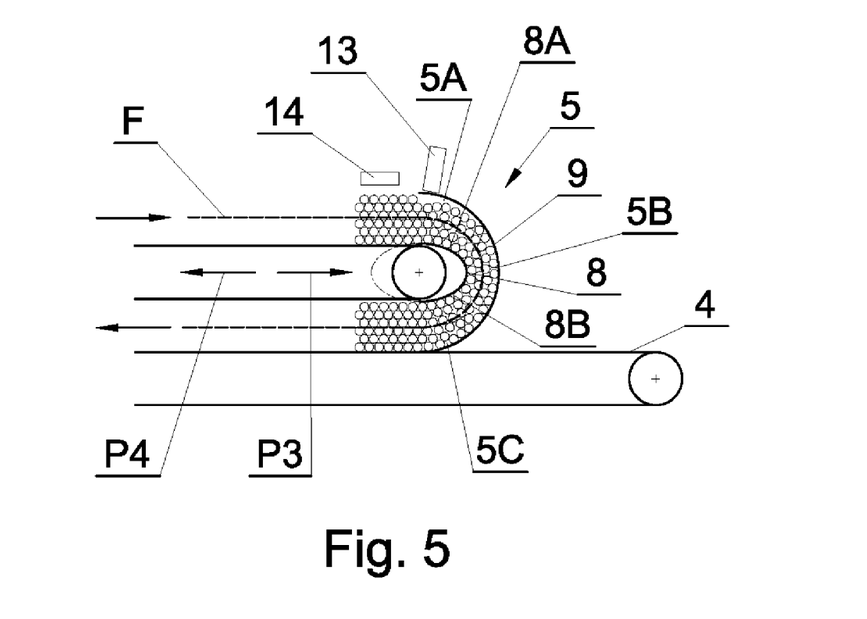

Local pressure exerted on the rod-like articles 2 in the lower part 5C of the transferring channel 5 is additionally decreased by the change of relative positions of the rod-like articles 2 in the multilayer stream F during transferring through this channel. In the transferring channel with a substantially constant cross-section, as known from the prior art, wherein the stream center line is substantially circular, the multilayer stream is transferred in such a way that, there are no significant changes of relative positions of the rod-like articles, because the width of the transferring channel corresponds substantially to the height of the multilayer stream and it does not change, while the pressure between the rod-like articles at the side of the inner wall of the transferring channel 5 increases significantly. While in the channel according to the invention after a portion of the rod-like articles 2, i.e. after a certain section of the multilayer stream F, enters into the upper part 5A of the transferring channel 5 (FIG. 5), said portion is sliding down by the upper part 8A of the first wall 8 into the middle part 5B of the transferring channel 5, which when the width of the transferring channel 5 is changed, forces a change of the relative positions of the rod-like articles 2. Said portion of the rod-like articles 2, during exiting from the middle part 5B of the transferring channel 5, will be in the widening lower part 5C of the transferring channel 5, which forces another change of the relative position of the rod-like articles 2. The rod-like articles will change their relative position, therefore the action of the stack of these rod-like articles is limited, which reduces the risk of deformation of the rod-like articles 2. If the multilayer stream F is stopped in the device, on the rod-like articles 2 lying on the second conveyor 4 the pressure is exerted by the rod-like articles 2 located in the middle part 5B and in the lower part 5C, while the pressure exerted by the rod-like articles located on the upper part 5A is only slightly transferred.

The transport device 1 comprises sensors for checking the correctness of the multilayer stream F. A sensor 13 checks the filling of the upper part 5A with the rod-like articles 2. In case of detection of insufficient filling, and the flow rate Q10 is greater than the flow rate Q11, and the first conveyor 3 together with the transferring channel 5 move in the first conveyor first displacing direction P3 corresponding to the first transferring direction F3, the first conveyor 3 together with the transferring channel 5 may be momentarily stopped or slowed down to restore the filling of the transferring channel 5. In case of detection of insufficient filling, when the flow rate Q10 is lower than the flow rate Q11, and the first conveyor 3 together with the transferring channel 5 move in the first conveyor second displacing direction P4 corresponding to the second transferring direction F4, the first conveyor 3 together with the transferring channel 5 may be momentarily accelerated in the first conveyor second displacing direction P4 to restore the filling of the transferring channel. A sensor 14 detects presence of the rod-like articles 2 above the multilayer stream F on the first conveyor 3. In case of detection of an excess of the rod-like articles 2, when the first conveyor 3 together with the transferring channel 5 move in the first conveyor first displacing direction P3, the first conveyor 3 with the transferring channel 5 may be momentarily accelerated in order to reduce the multilayer stream on the first conveyor 3. In case of detection an excess of the rod-like articles 2, when the first conveyor 3 together with the transferring channel 5 move in the first conveyor second displacing direction P4, the first conveyor 3 with the transferring channel 5 may be momentarily slowed down or moved in the first conveyor first displacing direction P3 in order to remove the excess of the rod-like articles from the multilayer stream on the first conveyor 3.

Figure 6:
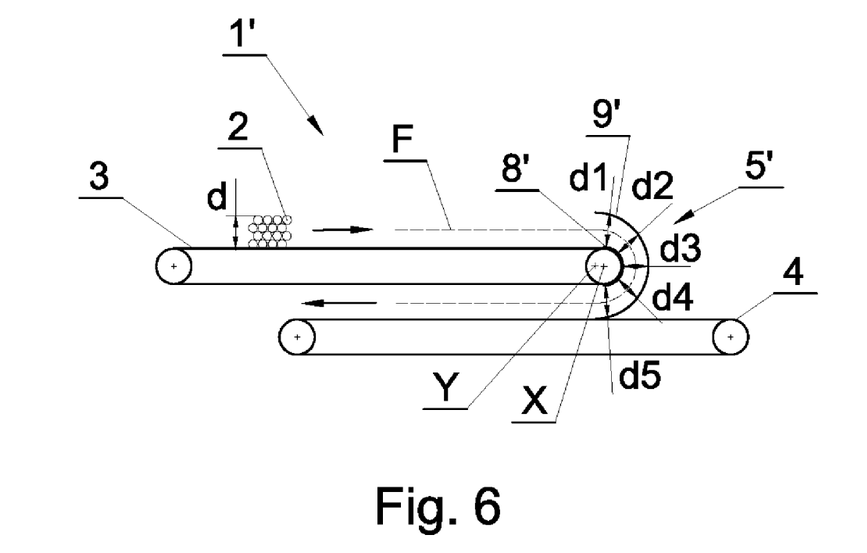
FIG. 6 shows a second embodiment of the transport device.

FIG. 6 shows a transport device 1' in a second embodiment, wherein a transferring channel 5' is limited by two surfaces 8' and 9', which have a form of cylindrical, circular non-coaxial surfaces. An axis of the first surface 8' is depicted as X, and an axis of the second surface 9' is depicted as Y. Similarly as in the first embodiment, the width of a transferring channel 5' is defined by the dimensions d1, d2, d3, d4, d5.

Figure 7:
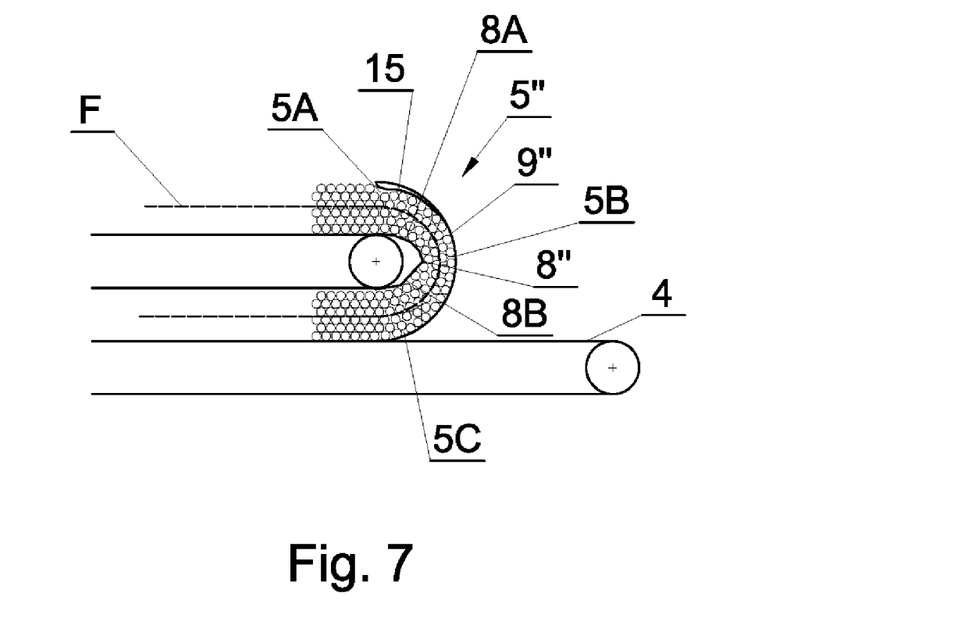
FIG. 7 shows a third embodiment of the transport device.

In a third embodiment presented in FIG. 7, a first wall 8" of a transferring channel 5" is made such, that its shape in a direction perpendicular to the plane of the drawing is defined by a multi-segment line, and a second wall 9''' is a section of a circular cylinder, wherein the narrowing of the transferring channel 5'' is located in the middle of the height of this channel. It should be noted that according to the invention, it is possible to freely combine the first and the second wall having any contours. This embodiment also presents a restraining element 15 having a form of an elastic element made of plastic or an articulated element in a form of a net or a chain made of plastic, which adapts in shape to the top layer of the rod-like articles 2 in the multilayer stream F in the upper part of the transferring channel 5''. The aim of the restraining element 15 is to prevent the rod-like articles 2 from falling freely in the event of incomplete filling of the transferring channel 5'', which may lead to crossing of the rod-like articles 2 in this channel. The restraining element 15 is mounted to the upper end of the second wall 9''' at the inlet side of the transferring channel 5''. The restraining element 15 may be used in the devices shown in the remaining embodiments.

Figure 8:
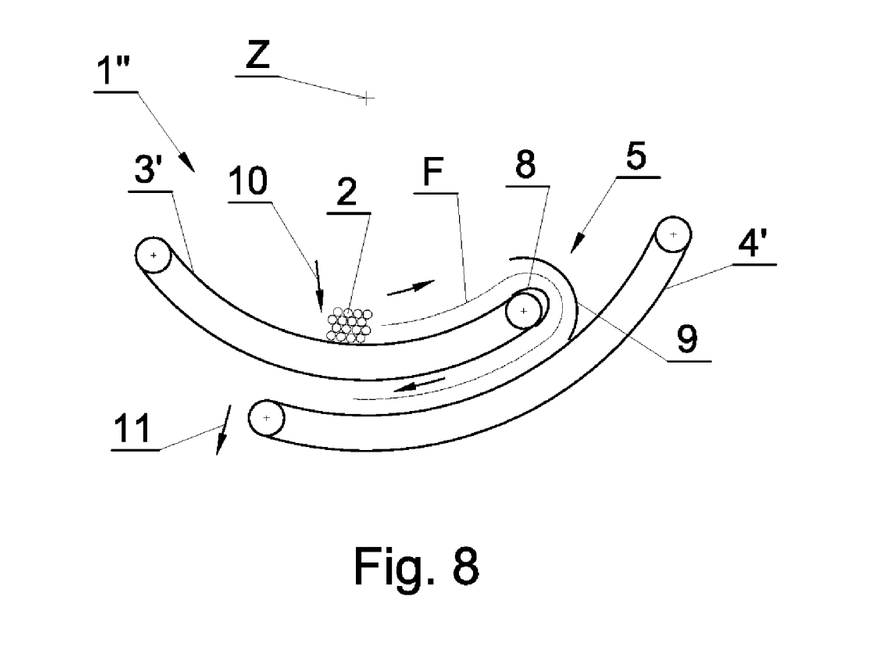
FIG. 8 shows a fourth embodiment of the transport device.

In a fourth embodiment presented in FIG. 8, the transport device 1'' comprises a first arcuate conveyor 3', a second arcuate conveyor 4' and the transferring channel 5 having the same form as in the first embodiment. The transferring channel 5 may have a form as presented in the other embodiments. The rod-like articles 2 are supplied in a supply direction 10 and are received in the receive direction 11. The conveyor 3' makes a rotary movement about a Z point of rotation located in the center of the curvature of the conveyor 3', which is also the center of curvature of the conveyor 4'.

Figure 9:
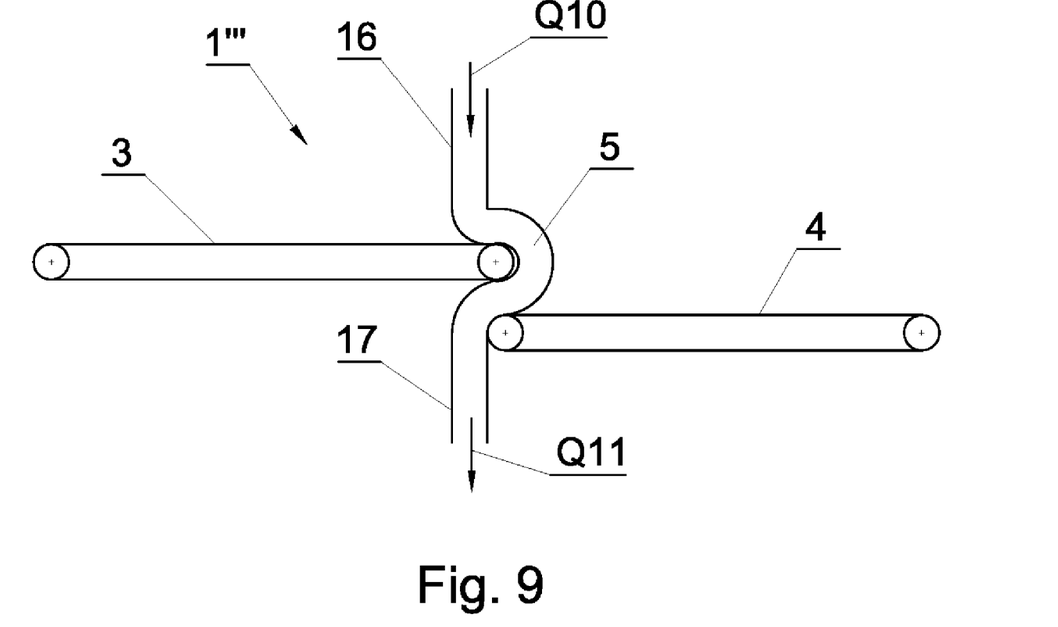
FIGS. 9 and 10 show a fifth embodiment of the transport device.
Figure 10:
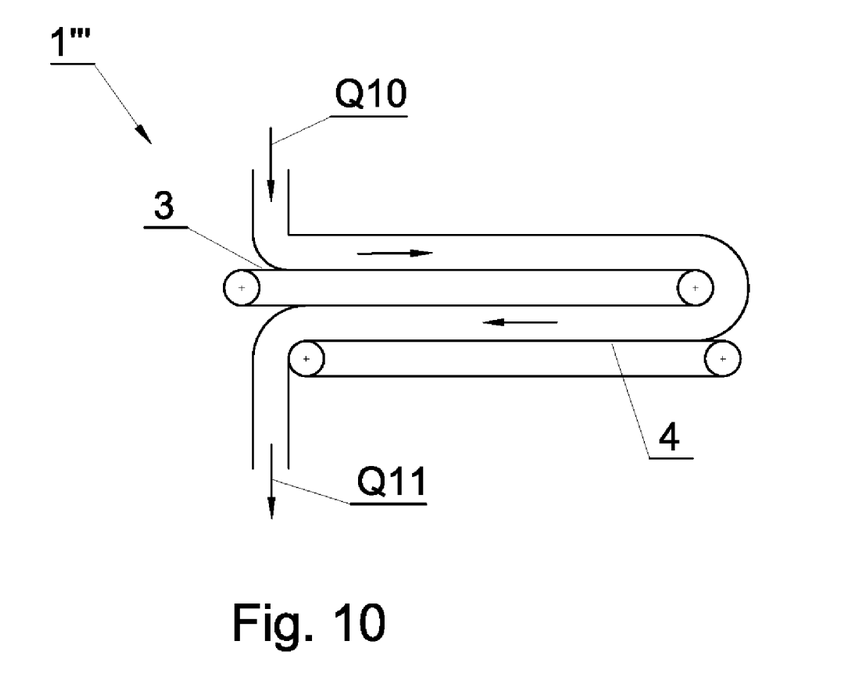

A transport device 1''' in a fifth embodiment presented in FIG. 9 comprises the first conveyor 3, the second conveyor 4, the transferring channel 5, an inlet channel 16 and an outlet channel 17. In the presented transport device 1''' the first conveyor 3 is located in the most left position. FIG. 10 shows the transport device 1''' from FIG. 9 after dislocating the first conveyor 3 to the most right position after certain period of operation of the device, when the input flow rate of the multilayer stream Q10 was greater than the output flow rate of the multilayer stream Q11.

Figure 11:
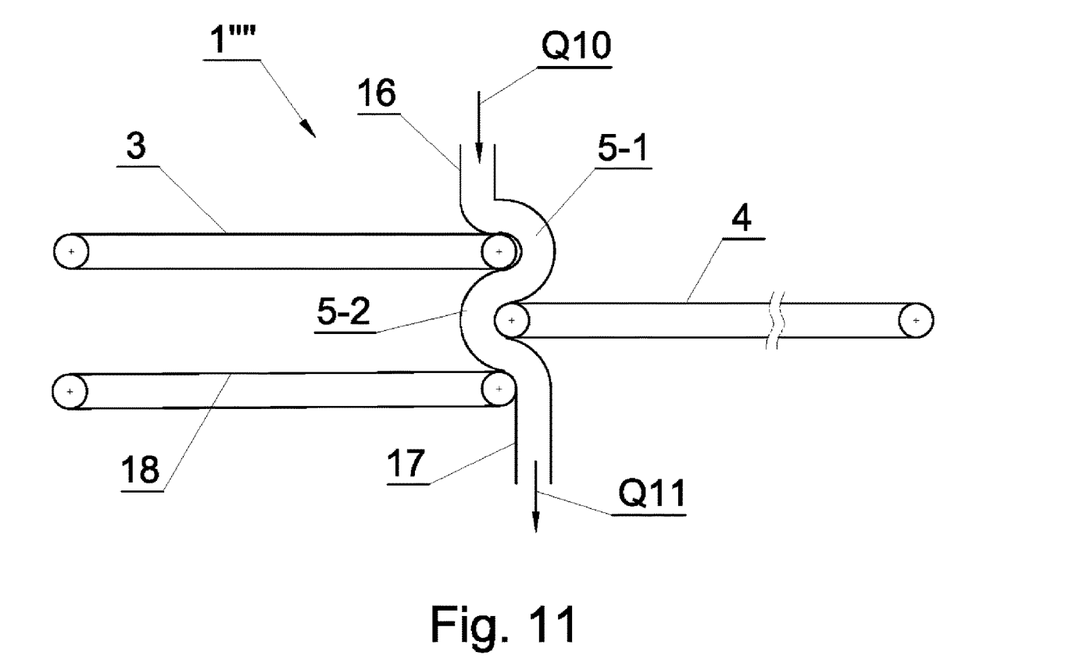
FIGS. 11 and 12 show a sixth embodiment of the transport device.
Figure 12:
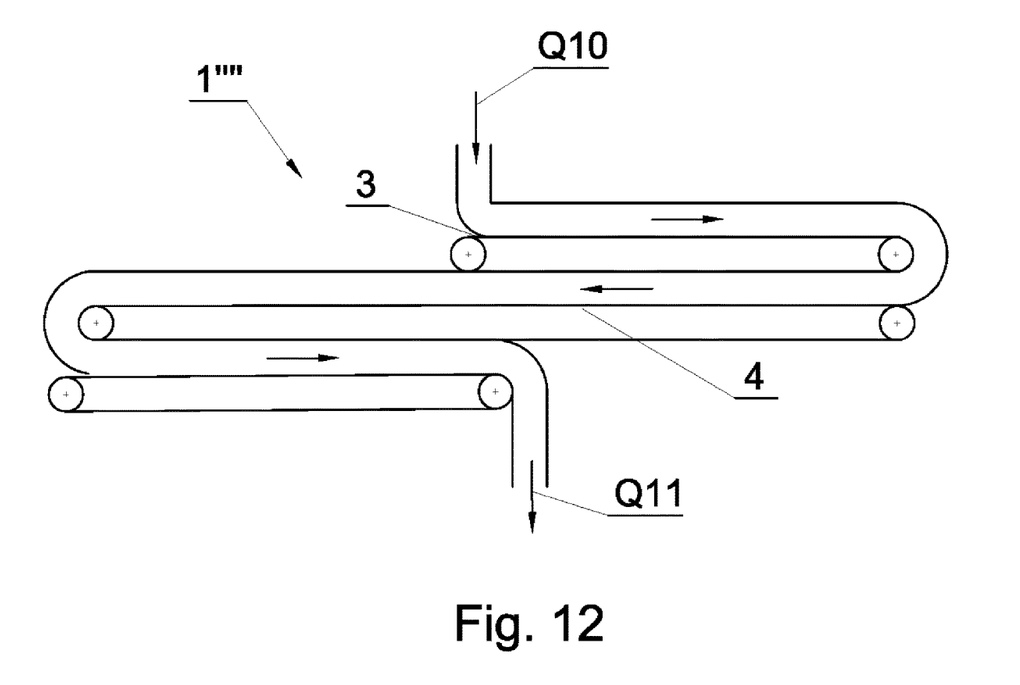

A transport device 1'''' in a sixth embodiment presented in FIG. 11 comprises the first conveyor 3, the second conveyor 4, a third conveyor 18, a first transferring channel 5-1, a second transferring channel 5-2, the inlet channel 16 and the outlet channel 17. The rod-like articles 2 flow through the first transferring channel 5-1 from the first conveyor 3 to the second conveyor 4. The flow along the first conveyor 3 and the second conveyor 4, which are located at least partially one above the other, is effected in opposite directions. The rod-like articles 2 flow through the second transferring channel 5-2 from the second conveyor 4 to the third conveyor 18, wherein the flow along the second conveyor 4 and the third conveyor 18 located at least partially one above the other is effected in opposite directions. In the presented transport device 1'''' the first conveyor 3 is in the most left position and the second conveyor 4 is in the most right position. FIG. 12 presents the transport device 1'''' from FIG. 11 after dislocating the first conveyor 3 to the most right position and the second conveyor 4 to the most left position after certain period of operation of the device, when the input flow rate of the multilayer stream Q10 was greater than the output flow rate of the multilayer stream Q11.

Further embodiments combining the features presented in the above examples are also possible within the scope of the present invention.

The invention claimed is:

1. A transport device for transferring rod-like articles, the device comprising:
    a first conveyor configured to transfer the rod-like articles as a multilayer stream in a first transferring direction;
    a second conveyor located at least partially below the first conveyor and configured to transfer the rod-like articles as the multilayer stream in a second transferring direction opposite to the first transferring direction;
    a first wall located at the end of the first conveyor and forming a cover at a distal end of the first conveyor;
    a second wall located above the second conveyor and distanced from the first wall by a distance equal to a width of the multilayer stream of the rod-like articles;
    a first transferring channel formed by the first wall and the second wall for transferring the rod-like articles from the first conveyor to the second conveyor in a third transferring direction;
        wherein at least the first conveyor and the first transferring channel are movable in a first conveyor displacing direction corresponding to the first transferring direction and the second transferring direction; and
    wherein the distance between the first wall and the second wall in the first transferring channel has a variable distance in a direction transverse with respect to the third transferring direction of the rod-like articles.

2. The device of claim 1, wherein the first wall has a shape of a section of a lateral surface of a cylinder having an elliptical base.

3. The device of claim 2, wherein the second wall has a shape of a section of a lateral surface of a cylinder having an elliptical base.

4. The device of claim 1, wherein the first wall has a shape of a section of a lateral surface of a cylinder having an elliptical base, and the second wall has a shape of a section of a lateral surface of a cylinder with a circular base.

5. The device of claim 1, wherein the first wall and the second wall are non-coaxial; the first wall has a shape of a section of a lateral surface of a cylinder having a circular base; and the second wall has a shape of a section of a lateral surface of a cylinder having a circular base.

6. The device of claim 1, wherein the shape of the first wall corresponds to a multi-segment line.

7. The device of claim 1, further comprising an articulated restraining element mounted to an inlet of an upper part of the transferring channel.

8. The device of claim 1, wherein the first conveyor is slidable linearly.

9. The device of claim 1, wherein the first conveyor is rotatable.

10. The device according of claim 1, further comprising a sensor for detecting filling level of the first transferring channel with the rod-like articles.

11. The device of claim 1, further comprising a sensor for detecting an excess of the rod-like articles on the first conveyor.

12. The device according of claim 1, further comprising an inlet channel and an outlet channel.

13. The device of claim 1, further comprising a third conveyor located at least partially below the second conveyor, and a second transferring channel for transferring the rod-like articles from the second conveyor to the third conveyor, wherein the flow along the second conveyor and the third conveyor are in opposite directions.

14. The device of claim 1, wherein the first transferring channel has the second wall formed as a chain conveyor.

15. The device of claim 1, wherein the first transferring channel has the second wall formed as a belt conveyor.

\* \* \* \* \*